United States Patent [19]

Jernigan

[11] 4,259,009
[45] Mar. 31, 1981

[54] FAR FIELD TARGET DESIGNATORS

[75] Inventor: James L. Jernigan, Inyokern, Calif.

[73] Assignee: The United States of America as represented by the Secretary of the Navy, Washington, D.C.

[21] Appl. No.: 61,737

[22] Filed: Jul. 30, 1979

[51] Int. Cl.³ .................. G01C 3/00; G01C 5/00; G02B 27/00; F41G 7/26
[52] U.S. Cl. ................................ 356/1; 244/3.16; 350/163; 356/349; 362/259
[58] Field of Search .............. 356/1, 4, 28.5, 152, 356/349; 244/3.16; 362/259; 350/163

[56] References Cited

U.S. PATENT DOCUMENTS

| | | | |
|---|---|---|---|
| 3,512,888 | 5/1970 | Humphrey | 356/4 |
| 3,523,732 | 8/1970 | Mary | 356/4 |
| 3,649,125 | 3/1972 | Lehmann | 356/28.5 |
| 3,695,749 | 10/1972 | Stapleton | 350/163 |
| 3,696,248 | 10/1972 | Cunningham et al. | 356/152 |
| 3,741,654 | 6/1973 | Brenholdt | 356/4 |
| 3,832,059 | 8/1974 | Iten | 356/28.5 |
| 3,953,128 | 4/1976 | Holly | 356/349 |
| 4,010,689 | 3/1977 | Sochard et al. | 102/213 |
| 4,047,117 | 9/1977 | Tuchyner et al. | 244/3.16 |

*Primary Examiner*—Stephen C. Buczinski
*Attorney, Agent, or Firm*—R. S. Sciascia; W. Thom Skeer; Kenneth G. Pritchard

[57] ABSTRACT

A target designation system is created by use of a dual-beam illumination subsystem of coherent light. One beam is shifted a discrete frequency level from the other beam. The beams diverge from the source until they overlap on the desired target. The difference in frequency when the beams overlap creates an interference pattern composed of moving fringes which scan across the target. Various receiver systems can be used to identify the scanning fringes and mark the target. In addition, without the use of a receiver subsystem, the illuminations subsystem can still be used as a ranging device which can be tuned to identify range to an object by adjustment of the beams until a maximum intensity moving fringe pattern is observed.

13 Claims, 6 Drawing Figures

FAR FIELD TARGET DESIGNATORS

BACKGROUND OF THE INVENTION

1. Field of the Invention

The present invention is for remote target designation systems. In greater particularly, the present invention is for a target designation system using a conventional laser to provide a unique far field pattern which can only appear on the target in question.

2. Description of the Prior Art

Target designators using laser light sources are currently in use for military systems. All of these sources are similar in that they require coherent light to illuminate the target. The target is illuminated at the wavelength of the emitted light. This can cause problems when small surfaces between the illuminator and the target scatter a small amount of light which can mislead any target seeking device such as a missile. In addition, such target seekers are susceptible to having attacking missiles inadvertently look down the target illuminator and home on the operator rather than the target.

SUMMARY OF THE INVENTION

A target designator system that works at a far field distance with only the target desired being illuminated is created by beam splitting the output beam of a conventional laser such as a Nd:YAG or Nd:glass laser. Approximately 50% of the beam is shifted in frequency a discrete amount by being diffracted from the laser's output beam. The undiffracted beam and the frequency shifted portion are then colliminated through an appropriate optic system and directed at the target in question. The beams are approximately parallel after their being split from the output beam. They are designed to slowly expand until they overlap at the distance to the target in question. As a result of this overlap at the target, the two beams will undergo interference and give rise to an interference fringe pattern. This interference pattern will not occur in the near field of the illuminator system because the beams do not overlap. Anyone or anything looking into the illuminator system will see two coherent light beams of slightly different frequency and will not see the interference pattern. At midfield where the beams are only partially overlapped, the interference pattern will be contained only within the overlapped portion of the beams whose signal strength compared with the unoverlapped portions will be small.

A receiving system can be made comprising any standard optical tracking system modified so as to defeat a high frequency modulated light beam. A focusing lens and photodiode-detector which are connected to an amplifier can serve as such a receiver. If an acousto-optic cell has been used to diffract the beam, the fringe pattern will scan across the target at the frequency used in the A.O. Cell. For the receiver system above, the amplifier output is passed through a band-pass filter tuned to the frequency used in the A.O. cell.

Ranging to the target from the illuminator can be accomplished in any of three ways. The first is by changing the frequency of the laser source. Very small changes in frequency of the output beam change the angle of diffraction when the beam is passed through a beamsplitter, such as a acousto-optic cell. This small angular change results in a change of the point where the beams will overlap. Changing the modulating frequency in the acousto-optic cell also changes the diffraction angle. This method provides very precise range changes. An alternate method controls one of the focusing mirrors in the illumination system. By changing the mirror angle slightly, such that the beams are not quite parallel within the illumination system, they will overlap at a different range down field from the illuminator.

PREFERRED EMBODIMENT OF THE INVENTION

Figures 1A, 1B:
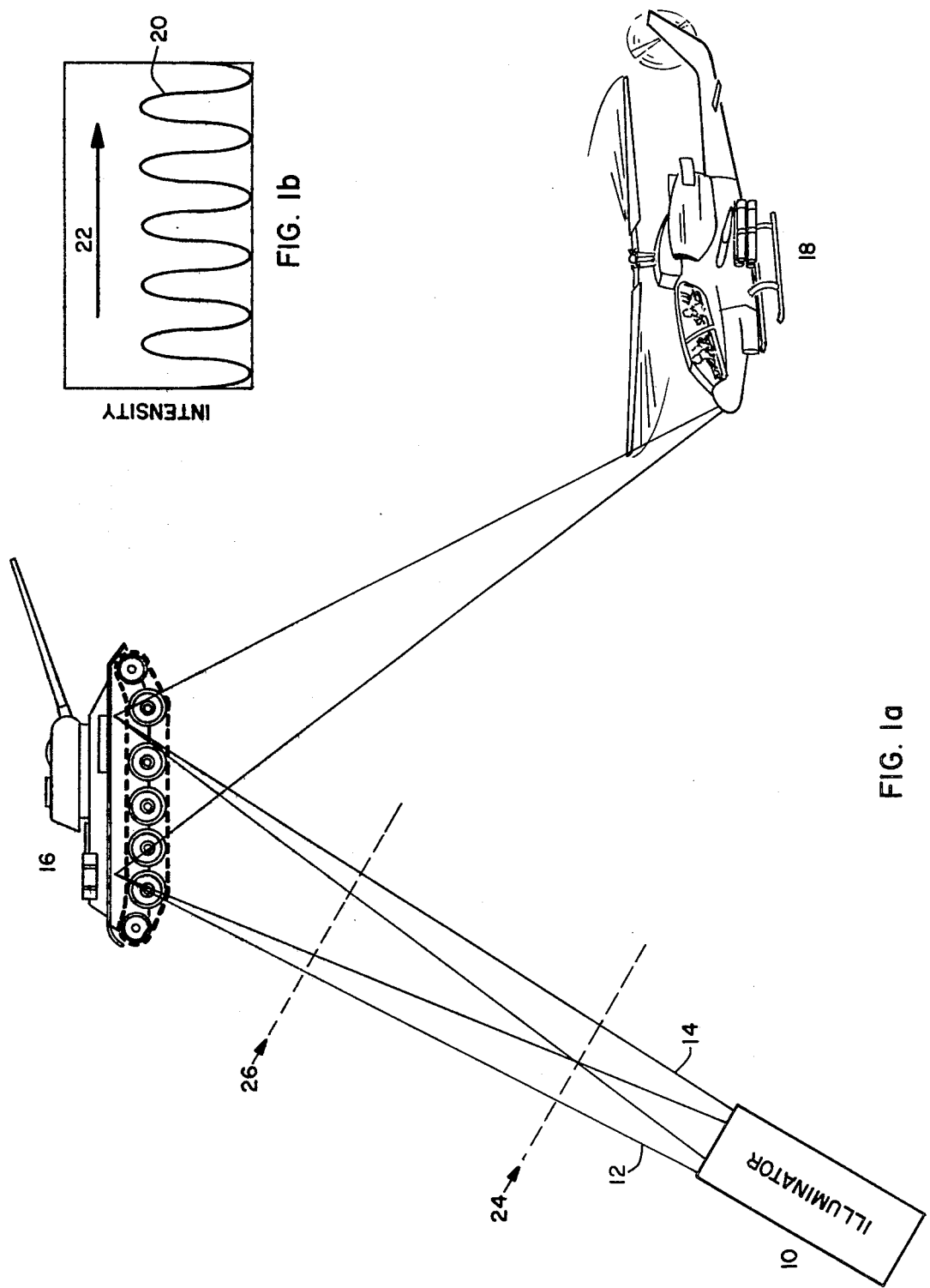
FIG. 1a and 1b are an operating scenario of the present invention.

FIG. 1a shows an operational view of a far field target designation system 10 emitting dual beams of light 12 and 14. Beams 12 and 14 are adjusted to overlap on a target 16, such as a tank. A receiver system, not shown, is located on some observational area or observational platform 18, such as a helicopter. FIG. 1b shows the image that is seen on target 16. A series of illuminated lines 20 of approximately equal intensity are shown across the target. Lines 20 will scan across the target as represented by arrow 22. The direction of scan is immaterial and can go either way depending on the configuration of target designator 10.

Dual beams 12 and 14 are coherent light which differ by a very small frequency shift. Prior to reaching position 24 the beams do not overlap and are distinct coherent beams with a slightly different frequency that can be observed. Between position 24 and position 26 the beams start to diverge across one another. This area of partial divergence produces a weak interference pattern on any object which is illuminated in this distance range. When the beams pass position 26, they can be considered to have completely overlapped and produce maximum intensity interference fringes 20. For a laser with frequencies in the optical range, the operator of illumination system 10 can actually tune the light until it produces maximum intensity of the fringes. If the beams do not meet on a target, it can readily be seen that the beams will cross through one another and the three regions which correspond to no overlap, partial overlap and interference overlap regions will be repeated in reverse order.

Figure 2:
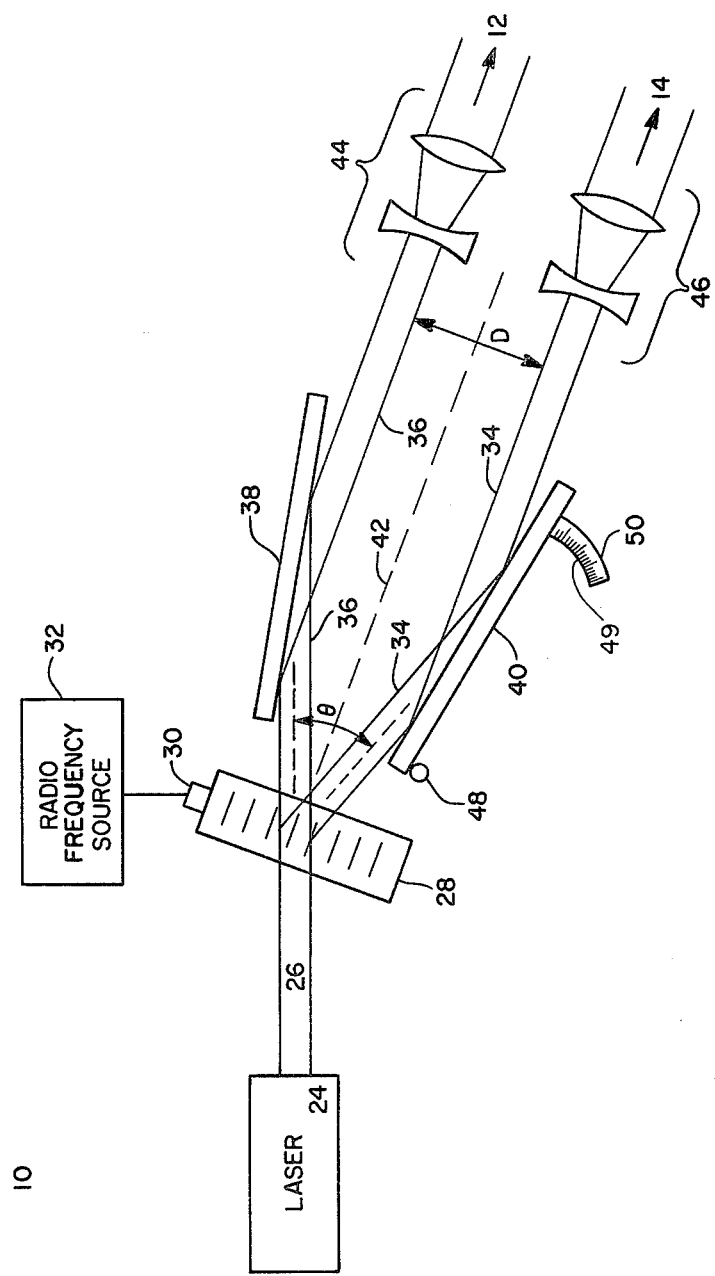
FIG. 2 is a diagram of an illumination system used in the present invention.

FIG. 2 shows a detailed breakdown of illumination system 10. Any conventional laser source 24 such as a Nd:YAG laser, Nd:glass laser or various gas lasers, can be used. Laser 24 emits an output beam 26 which is passed through an acousto-optic cell 28. Acousto-optic cell 28 has a transducer 30 which is connected to a radio frequency source 32. Source 32 sends radio frequencies into transducer 30 for transmittance through acousto-optic cell 28 in a well known manner. A portion of beam 26 will be diffracted through an angle $\theta$ as shown. The remaining portion of beam 26 will pass through acousto-optic cell 28 undiffracted. This will result in output beam 26 being subdivided into a diffracted portion 34 and an undiffracted portion 36. In addition to diffracted portion 34 being deflected through an angle $\theta$, it will have its frequency shifted by an amount equal to the radio frequency passing through acousto-optic cell 28. If output beam 26 is considered to have a frequency of $\nu_0$, then undiffracted beam 36 will have the same frequency, $\nu_0$, while diffracted beam 34 will have a frequency $\nu_0 + \nu_s$, for the configuration shown in FIG. 2 where $\nu_s$ equals the frequency of the radio source. The frequency of the radio source is actually the sound frequency, $\nu_s$, through acousto-optic cell 28. As can be readily seen, diffracted beam 34 can just as easily have an output frequency of $\nu_0 - \nu_s$ by reversing the direction of acousto-optic cell 28. Beams 34 and 36 should have approximately equal intensity, which can be easily controlled by applying a radio frequency power level necessary to produce 50% diffraction. Undiffracted beam 36 is then reflected off a mirror 38 and diffracted beam 34 is similarly reflected off a mirror 40 such that beams 34 and 36 travel approximately parallel paths along axis 42. Beams 34 and 36 are then adjusted by appropriate optical systems 44 and 46, which can be any appropriate converging diverging lens arrangement, to produce output beams 12 and 14 as shown previously. Output beams 12 and 14, upon emission from optical systems 44 and 46, will have a characteristic range at which they will produce complete overlap for maximum interference effect.

To focus beams 12 and 14 at different ranges, three techniques can be used. The first requires that laser 24 be a tunable laser. As the frequency of output beam 26 is varied, the angle $\theta$ through which diffraction will occur will change. Thus, the location at which diffracted beam 34 will be reflected off of mirror 40 will change, producing a slightly different orientation between beams 34 and 36 as they enter optical focusing systems 44 and 46.

The second technique is similar to the above only the laser frequency is held stable while the frequency from radio frequency source 32 is changed. This change permits very precise changes in diffraction angle $\theta$. With current technology, this is the most precise ranging that can be performed.

The last method of changing the range can be performed as shown in FIG. 2. Mirror 40 is shown pivoted at point 48 and connected to some slide mechanism 50. By adjusting mirror 40 along slide mechanism 50, the orientation between beams 34 and 36 prior to their entrance into optical systems 44 and 46 can once again be controlled such that the point of the overlap between beams 12 and 14 upon their immergence from illumination system 10 can be controlled.

The first two of these methods change the angle $\theta$ shown in FIG. 2. For a specified angle $\theta$ the distance from the detector to where the beams triangulate to produce complete overlap is a unique distance. To change the point of beam overlap as a target moves, the angle $\theta$ must be varied to adjust for the changing distance. For battlefield applications, a target designator must have a reasonable range at which it can function, enemy targets will not cooperate and maintain a fixed separation. Thus, any readout which corresponds to a particular angle $\theta$, provides an exact determination of how far the beams travel to their total overlap region. An operator of this device establishes the distance to a target by adjusting $\theta$ so the fringes appear with maximum intensity of the target. This observation identifies the triangulation pattern the beams must make to cross at the target. For fixed mirrors 38 and 40 and a constant RF from source 32, a different value of $\theta$ will occur for each change of frequency from laser 24. Identifying the frequency emitted by laser 24 establishes a unique angle $\theta$ which in turn represents a unique range. Holding laser 24 to a constant frequency and varying RF source 32, produces the same unique determination of $\theta$ and its corresponding range. For fixed optical and RF frequencies, rather than changing $\theta$ the beams convergence angle is changed by sliding mirror 40 along scale 49 on slide mechanism 50. Each gradation on scale 49 represents a different converging angle $\beta$ and therefor each gradation represents a different range. Converging angle $\beta$ is shown in FIG. 6.

For the device shown in FIG. 2, the optical linewidth over which interference can be produced is only limited by the modulation bandwidth of acousto-optic cell 28. This is in turn a function of the width of transducer 30. The coherence length requirement for this device is that the coherent light is sufficiently long to provide coherent interference across the target. That is, if the targert is five fringes wide, a coherence length of five wavelengths is all that is required. The optical linewidth cannot be so broad that a dispersive shift through acousto-optic cell 28 will shift the beam position over the width of a fringe. The exact requirement of bandwidth can be calculated as follows. For an acoustic wavelength $\Omega$ of approximately 10 microns in an acousto-optic cell, the ratio of the change of wavelength to wavelength can be shown to approximately $2\Omega/D$ where D is the separation of beams 34 and 36 as shown in FIG. 2 prior to their entrance into optical focusing sections 44 and 46. For most lasers in use today, this requires reasonably well defined linewidths, on the order of a few angstroms. This can either be provided through Nd:YAG lasers or the appropriate filtering of output beam 26 if necessary.

Figure 5:
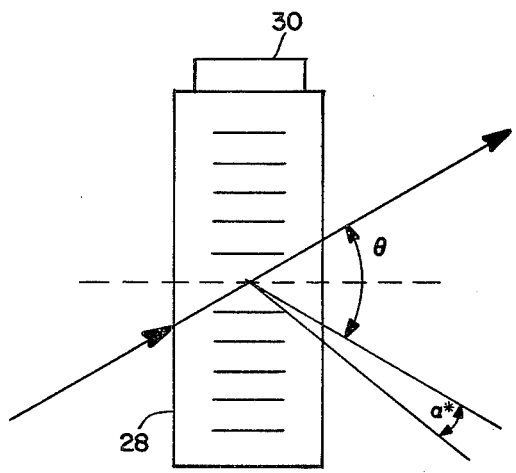
FIG. 5 shows the beam path through an acousto-optic cell.

This relationship can be shown mathematically by the fact that fringe separation distance d is equal to $\lambda/2\alpha$ where $\alpha$ is the divergent angle of light of wavelength $\lambda$, which is diffracted from acousto-optic cell 28. The angular relationships involved are shown in FIGS. 5 and 6. FIG. 6 shows the beam centerlines 85 and 87 crossing at point 88. Centerlines 85 and 87 and separation distance D define an isosceles triangle of base D and height along arrow R. The height is a function of base D and angle $\beta$ according to height $= D/2 \tan \beta/2$ which makes use of the well known property of the isosceles triangle that the height bisects the base and the apex angle. Isosceles triangles of Base D and angle $\beta$ are similar to the isosceles triangles of angle $\beta$ and base d. Angle $\beta$ is varied by changing either angle $\beta$ or the orientation of mirror 40.

Figure 6:
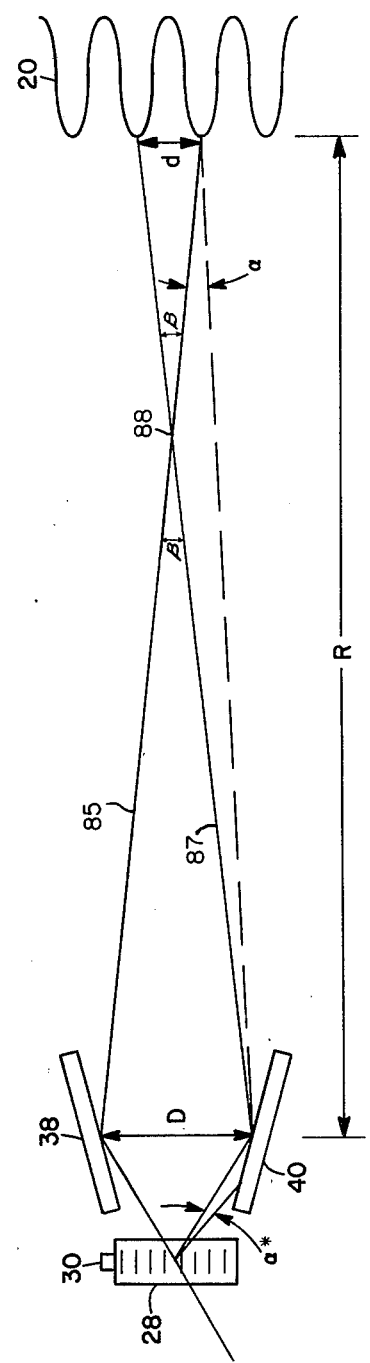
FIG. 6 shows the geometric arrangement of the optics used.

As shown in FIG. 6, the fringe spacing d over a range R from the illumination source permits use of the small angle approximation, thus $\alpha = d/R$. The dispersion relationship of angle $\alpha^*$ is due to the beamwidth of the laser light. If the laser light was a pure single wavelength, angle $\alpha^*$ would be zero. For a finite range of wavelengths, the diffraction angle $\theta$ will vary through a range $\alpha^*$. As an approximation, it can be shown that the distance d, which is the distance between fringes, is equal to $\lambda/2\alpha$, where $\lambda$ is the characteristic wavelength of the light in question. Since $\alpha$ is equal to D/R, this converts to $d = \lambda R/D$ or $\alpha^* = d/R$ which is the same as saying $\alpha^* = \lambda/D$. Optical dispersion due to the diffraction of the acoustic wave in acoustic-optic cell 28 can be further defined down by the equation $\lambda = 2\Omega \sin \theta$, which for a small angle is the equivalent of $\lambda = 2\Omega\theta$. Thus, the ratio of change in wavelength, $\Delta\lambda$, to wavelength, $\lambda$, or $\Delta\lambda/\lambda$ is approximately $2\Omega/d$. For the characteristic values of 10 microns for $\Omega$ with a laser wavelength of 10,000 Å and a separation distance D between beams of 4.0 cm, this can be reduced to a ratio of $\Delta\lambda/\lambda$ of approximately 0.0005 or as described previously, for a 10,000 Å laser, a bandwidth of 5 Å or less is required.

As stated previously, sufficient radio frequency power must be used to provide 50% diffraction in acousto-optic cell 28. In general the amount of radio frequency power required to do this will be dependent on two variables, (1), the transducer width and (2) the material that comprises the acoustic-optic cell. As an example of a usable material, lithium niobate has narrow $\Omega$ and a corresponding low power requirement. However, this material is subject to thermal stress which a material such as quartz would not be. Unfortunately, quartz has significantly larger $\Omega$ and significantly higher power requirements. In general, for comparably similar acousto-optic cells, the change from lithium niobate to quartz would require 10 times as much power and a significantly narrower bandwidth requirement. Trade-offs for any given system will depend on the type of use desired. Low power systems can be used with backpacks. High power systems might be better suited for ship or tank mountings.

In addition to the use of an acousto-optic cell and transducer like that shown, a moving diffraction grating could be substituted to provide the necessary beam diffraction and frequency shift. However, such a moving device would be difficult to synchronize and in addition would have problems of continuity since sooner or later the diffraction grating would have to return to the starting location. Thus, an acousto-optic cell provides a highly preferred embodiment for providing the diffraction properties required in the present invention. Care must be taken to insure that the acousto-optic cell is properly terminated. That is, no return reflections are permitted, otherwise beam clarity between the undiffracted and diffracted beams will be severely degraded. An example of such a method can be found in U.S. Pat. No. 3,564,416, entitled "Improved Delay Cell Permitting The Ends To Be Terminated" by James L. Jernigan.

Figure 4:
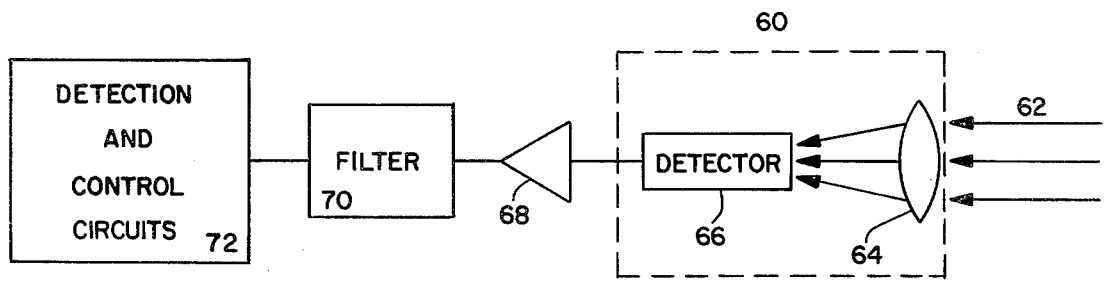
FIG. 4 is a block diagram of a receiver subsystem which can be used in the present invention.

FIG. 4 shows a block diagram of a receiver subsystem which can be used in the present invention. In general, an optical tracking system 60 is used to observe the fringes which are observed as represented by arrows 62. Optical tracking system 60 can be comprised of any of the well known systems known in the art and in general can be represented by a focusing lens 64 and detector 66 such as a photodiode. The detector or a series of detectors in the focal plane of the lens must be smaller than the image of the individual fringes in order to sense the fringe frequency. The output from detector 66 is processed by an amplifier 68 and passed through a filter 70 which must be a tuned filter to match the acousto-optic modulation frequency. If the unit is ranged by changing RF source 32 frequency, this unit must search for the frequency and lock on to it. This searching and locking of the filtered signal can be performed by any detection and control circuit 72 which are known in the art.

Figure 3:
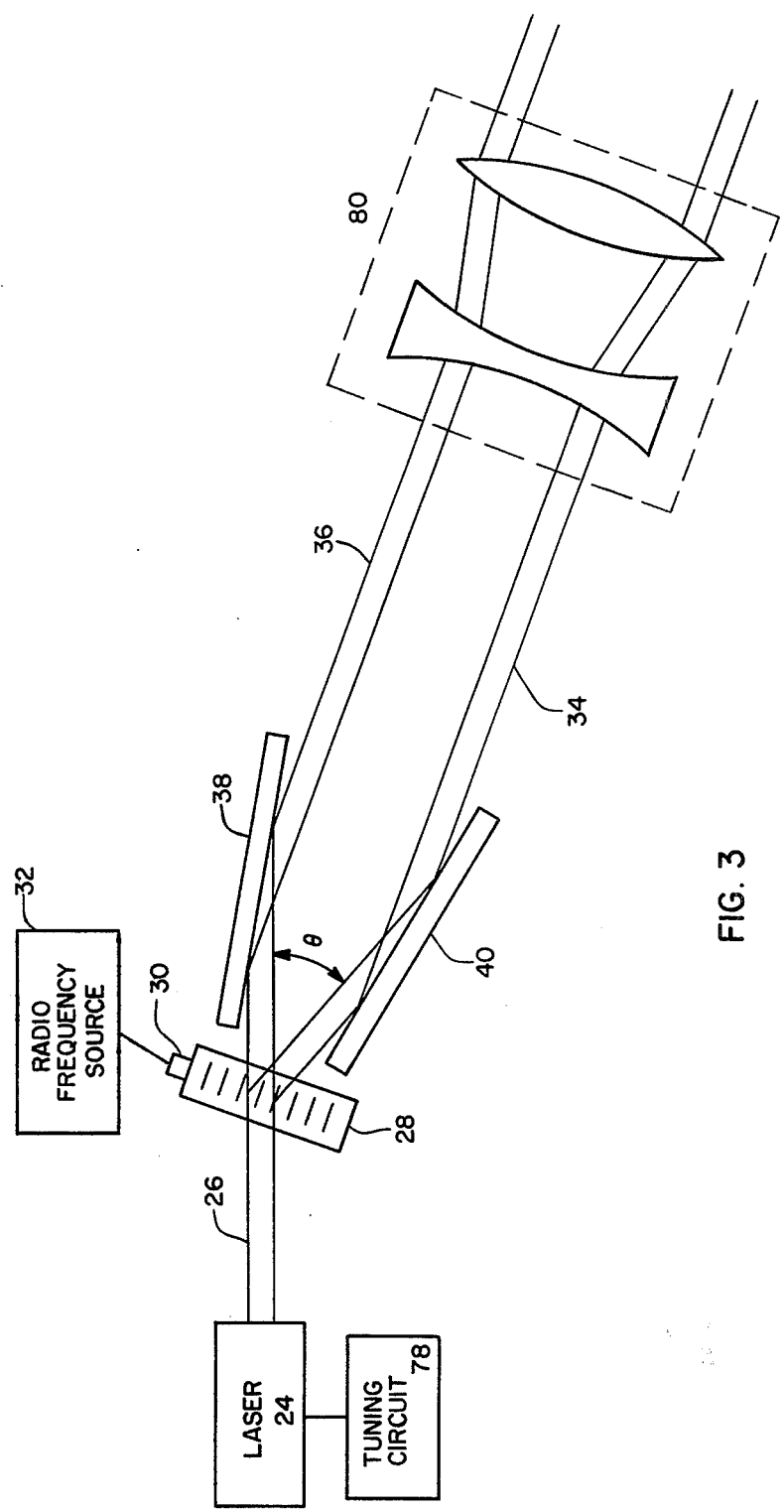
FIG. 3 is an alternate embodiment illumination system for use in the present invention.

FIG. 3 shows an alternate embodiment of the present invention. Laser 24 is controlled by a tuning circuit 78 in any of the well known fashions for tunable lasers and undiffracted beam 36 and diffracted beam 34 are collimated by a single telescope optical focusing system 80.

As can easily be seen, if no receiving subsystem is used to observe the fringes, the actual operator of the illumination system can use the illumination subsystem as a ranging device. Tuning the illumination system until peak intensity of fringe pattern of the desired object is obtained establishes range to the object. When this occurs, a calibrated illumination device can provide the range to the target within relatively narrow limits.

In addition to the uses and methods of operation taught above, it will be clear to those skilled in the art that several other variations and modifications can be made to the above described invention while still following the basic principles and methods of operations thereof.

What is claimed is:

1. A target designator system with separate illumination and receiver subsystems comprising:
   a laser for producing a coherent beam of light;
   a beam splitting device placed in said light beam for diffracting half of said light beam through a predetermined angle so that it travels along a different path from that traveled by the undiffracted half of said light beam, whereby said diffracted beam is shifted in frequency by said beam splitting device;
   a pair of mirrors, one placed in each path of said divided light beam for reflecting said divided beam onto two approximately parallel paths;
   optical focusing means in the paths of said approximately parallel beams for controlling the expansion of said beams, whereby said beams are diverged until they overlap on a target at a predetermined range producing interference fringes; and
   means for receiving at a predetermined location the interference fringes reflected from said target.

2. A target designator system with separate illumination and receiver subsystems comprising:
   a laser for producing a coherent beam of light;
   an acousto-optic cell placed in said light beam for diffracting half of said light beam through a predetermined angle $\theta$ so that it travels along a different path from that traveled by the undiffracted half of said light beam, whereby said diffracted beam is shifted in frequency by said acoustic-optic cell;
   a pair of mirrors, one placed in each path of said divided light beam for reflecting said divided beam onto two approximately parallel paths;
   optical focusing means in the paths of said approximately parallel beams for controlling the expansion of said beams, whereby said beams are diverged until they overlap on a target at a predetermined range producing interference fringes; and
   means for receiving at a predetermined location the overlapping light reflected from said target, whereby said target reflected light is determined due to modulation of said overlapping light at the frequency of said acoustic-optic cell.

3. A target designator system as described in claim 1 wherein said optical focusing means comprises a pair of telescopes which adjust divergence of said beams of light such that their paths to a target create three separate optical regions which can be categorized as no overlap, partial overlap and total interference overlap regions.

4. A target designator system as described in claim 2 wherein said optical focusing means comprises a pair of telescopes which adjust divergence of said beams of light such that their paths to a target create three separate optical regions which can be categorized as no overlap, partial overlap and total interference overlap regions.

5. A target designator system as described in claim 1 wherein said optical focusing means comprises a telescope which adjusts the divergence of said beams of light such that their paths to a target create three separate optical regions which can be categorized as no overlap, partial overlap and total interference overlap regions.

6. A target designator system as described in claim 2 wherein said optical focusing means comprises a telescope which adjusts the divergence of said beams of light such that their paths to a target create three separate optical regions which can be categorized as no overlap, partial overlap and total interference overlap regions.

7. A target designator system as described in any of claims 2, 5 or 6 wherein said receiving means comprises an optical detector tuned to the radio frequency of the acousto-optic cell.

8. A target designator system as described in any of claims 2, 5 or 6 wherein said acoustic-optic cell is comprised of lithium niobate.

9. A range measurement device comprising:
a laser for producing a coherent beam of light;
an acousto-optic cell placed in said light beam for diffracting part of said light beam through a predetermined angle $\theta$ so that said diffracted part travels along a different path from that traveled by the undiffracted remainder of said light beam;
a transducer connected to said acousto-optic cell for inputting a radio frequency to said acousto-optic cell for diffracting said part of said light beam, whereby said diffracted part is shifted in frequency by said acousto-optic cell;
a pair of mirrors, one placed in each path of said divided light beam for reflecting said divided beam onto approximately parallel paths, such that said diffracted and undiffracted light beams converge with angle $\beta$ and form an isosceles triangle;
optical focusing means in said parallel paths for controlling the expansion of said parallel beams, whereby said parallel beams are diverged until they overlap on an object producing interference fringes; and
means for varying angle $\beta$ such that for each value $\beta$ a unique isosceles triangle is formed by said diffracted and undiffracted light beams, said isosceles triangle having a height which is a function of angle $\beta$ and where the range to said object is a function of said height whereby setting the angle $\beta$ by either changing $\theta$ or one of said pair of mirrors establishes a unique range at which maximum interference can occur for a specific angle $\beta$.

10. A range measurement device device as described in claim 9 wherein said acousto-optic cell is comprised of lithium niobate.

11. A range measurement device as described in claim 9 wherein said angle varying means comprises a tuning circuit connected to said laser for changing the frequency of said laser's emitted light.

12. A range measurement device as described in claim 9 wherein said angle varying means comprises a tuning circuit connected to said acousto-optic cell for changing the frequency in said acousto-optic cell such that the diffraction angle is precisely controlled.

13. A range measurement device as described in claim 9 wherein said angle varying means comprises at least one movable mounting connected to said pair of mirrors for varying in a predetermined manner the absolute deviation from parallel between said divided beam paths.

* * * * *